United States Patent [19]

Mizoule

[11] 4,369,579

[45] Jan. 25, 1983

[54] DEVICE FOR DRAWING A PATTERN ON A SUPPORT, PARTICULARLY FOR USE AS A TOY

[75] Inventor: Henri Mizoule, Versailles, France

[73] Assignee: William Gardel, Ville d'Avray, France

[21] Appl. No.: 258,907

[22] Filed: Apr. 30, 1981

[30] Foreign Application Priority Data

May 5, 1980 [FR] France ............................... 80 09998

[51] Int. Cl.$^3$ ............................................ G01D 15/00

[52] U.S. Cl. .................................... 33/1 M; 33/18 R; 33/27 L; 33/189; 46/240; 346/8; 346/17; 346/139 R

[58] Field of Search ................... 33/1 M, 18 R, 18 A, 33/125 R, 189, 27 L; 346/139 R, 8 R, 17; 46/240, 239

[56] References Cited

U.S. PATENT DOCUMENTS

| | | | |
|---|---|---|---|
| 1,174,787 | 3/1916 | Wilkinson | 346/17 |
| 1,310,201 | 7/1919 | Maxim | 346/18 |
| 2,675,291 | 4/1954 | Webster | 33/18 R X |
| 3,281,853 | 10/1966 | Madeira et al. | 346/8 R |
| 3,376,578 | 4/1968 | Sawyer | 346/139 R |
| 3,510,949 | 5/1970 | Christy | 33/27 L |

FOREIGN PATENT DOCUMENTS

| | | | |
|---|---|---|---|
| 844366 | 7/1952 | Fed. Rep. of Germany | 33/1 M |
| 2758642 | 5/1979 | Fed. Rep. of Germany . | |
| 1132387 | 10/1968 | United Kingdom . | |

*Primary Examiner*—William D. Martin, Jr.
*Attorney, Agent, or Firm*—Holman & Stern

[57] ABSTRACT

The device comprises a box, a pencil-holder with a magnet, for sliding on the box, a carriage in the box, with a magnet, and means for moving the carriage for displacing the pencil-holder through the magnets. A drawing support is placed on the box, so that a pencil in the pencil-holder can draw a pattern on the support as the carriage is moved.

10 Claims, 7 Drawing Figures

DEVICE FOR DRAWING A PATTERN ON A SUPPORT, PARTICULARLY FOR USE AS A TOY

The present invention relates to a device for drawing a pattern or design on a support, particularly for use as a toy, and more particularly to a simple, robust device adapted to serve as a toy.

To this end, the invention relates to a device for drawing a pattern or design on a support, comprising a pencil holder fast with a magnetic piece sliding on a plate and moved, through said plate, by a first magnet, characterized in that said device comprises:

a box, generally parallelepipedic in form, with an upper wall composed of non-magnetic material, in this box: a carriage movable along the X- and Y-axes relatively to the plane of the upper wall of the box, control means for displacing the carriage along the X- and Y-axes, a first magnet mounted on the carriage, one of its magnetic poles, called first pole, facing the upper wall of the box, a pencil-holder adapted to rest on the outer face of said upper wall of the box, this pencil-holder comprising: (a) a guide for receiving and holding at least laterally a pencil with the axis thereof not parallel to the plane of said upper wall and with the active tip of the pencil in contact with a drawing support resting on the upper wall of the box, (b) a second ring magnet adapted to cooperate with the first magnet, its pole opposite that of said first pole facing downwards, the opening of the second magnet being placed opposite the guide so as to surround the end of the pencil, and (c) at least one sliding member by which the pencil holder is adapted to slide on said drawing support.

The guide advantageously further comprises stop means on which the pencil may rest by counter-stop means, this guide being mounted on a body of the pencil holder, via an elastic member allowing a downward movement of said guide with respect to said body, by the application of a force, said body resting on the upper wall of the box via the sliding member, and the magnetic piece is mounted on said guide.

The invention will be more readily understood on reading the following description with reference to the accompanying drawings, in which.

Figure 1:
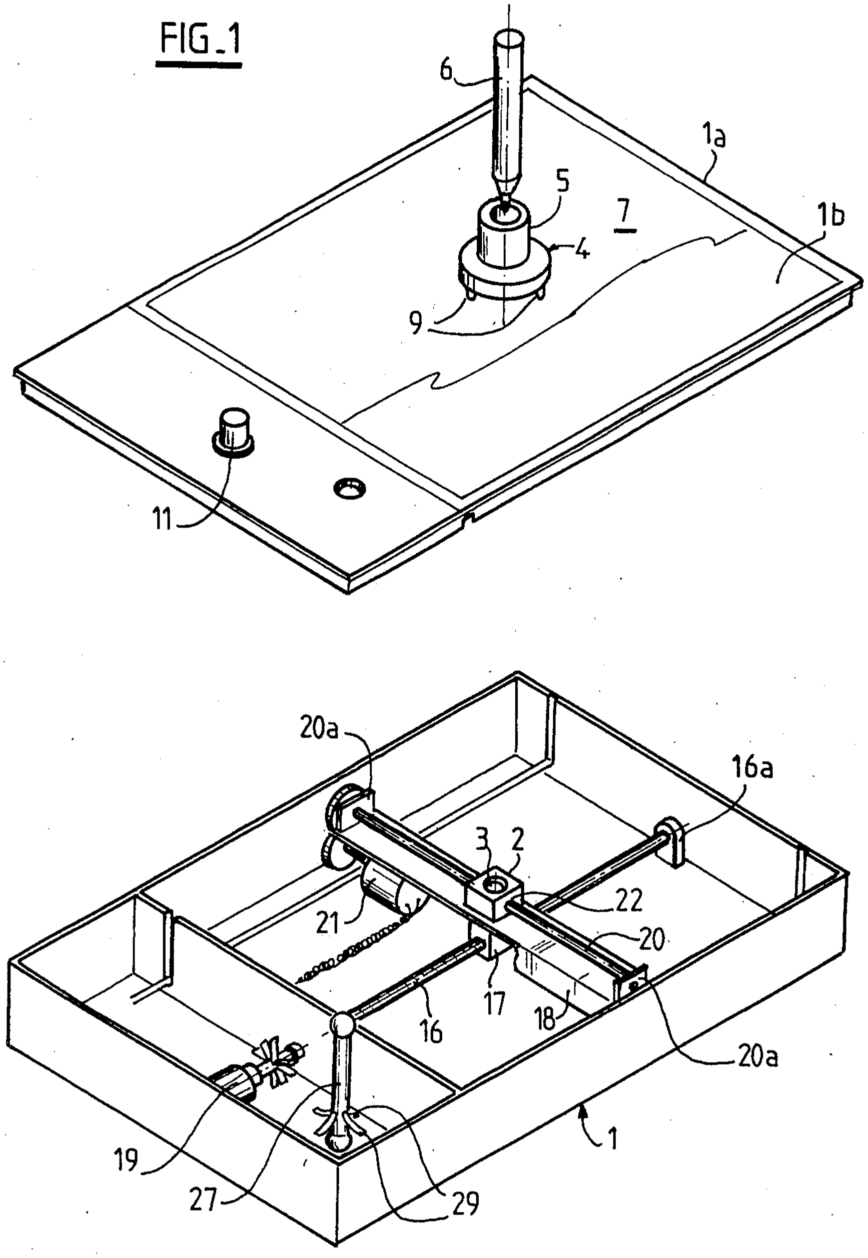
FIG. 1 is an exploded view in perspective of the device according to a first embodiment of the invention.

Referring now to the drawings, the drawing device shown in FIG. 1 comprises: a relatively flat box 1 generally parallelepipedic in form, made of a non-magnetic material, for example of plastics material.

In this box 1 is located a carriage 2 movable along the X- and Y-axes relatively to the general plane of the box 1.

Control means which will be described hereinafter are provided to displace the carriage 2 along the X- and Y-axes.

A permanent magnet 3 (FIG. 2) is mounted on the carriage 2 so that one of its magnetic poles, 3*a*, called first pole, faces the upper wall 1*a* of the box 1.

A pencil-holder 4 is adapted to rest on the outer face 1*b* of said upper wall 1*a* of the box 1; this pencil-holder 4 comprises: (a) a guide 5 for receiving and holding a pencil 6 with the axis 6*a* thereof perpendicular to the plane of said upper wall 1*a* and with the active tip 6*b* of the pencil 6 in contact with a sheet of paper 7 resting on the upper wall 1*a* of the box 1, (b) a second permanent magnet of which the pole opposite that of said first pole 3*a* of the first magnet 3 faces downwardly, and (c) a plurality of sliding feet 9 by which the pencil-holder 4 slides on the paper 7; each foot 9 has a founded free end 9*a* which reduces friction when the pencil-holder 4 slides on the paper 7.

According to the examples shown, the guide 5 essentially comprises a cylindrical wall 5*a* of vertical axis whose inner diameter is slightly larger than the diameter of the cylindrical body of the pencil 6, so that the latter, once engaged in the recess of said wall 5*a*, is maintained perpendicular to the plane of the paper 7 on which it draws a line by its tip 6*b*; the latter thus functions under the best conditions.

The upper wall 1*a* of the box 1 is translucent and a source of light 10 of reduced dimensions (FIG. 2) is placed on the carriage 2 to emit a light beam towards the upper wall 1*a* of the box 1. A luminous point visible from the outside is thus obtained on the wall 1*a*, this luminous point indicating the position of the carriage 2 inside the box 1.

The source of light 10 is an electric lamp whose electric current supply is controlled by a manoeuvring member, for example a push button 11 (FIG. 1) placed on the outside of the box 1.

Figure 2:
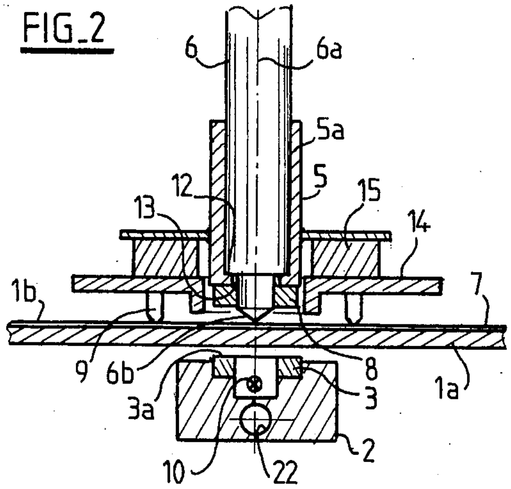
FIG. 2 is a view in elevation and in vertical section showing a first embodiment of the pencil-holder of the invention.

According to the embodiment shown in FIG. 2, the guide 5 further comprises stop means 12 on which the pencil 6 may abut by counter-stops 13; said pencil is force-fitted in the guide 5 which is itself mounted on a body 14 of the pencil-holder 4, via an elastic suspension element 15, for example made of open-cell plastics foam, allowing, by the application of a weak downward force in FIG. 2, a downward movement of said guide 5 with respect to said body 14, the latter resting on the upper wall 1*a* of the box 1 via the sliding feet 9; the second magnet 8 is mounted and fixed on said guide 5. Thus, when the magnets 3 and 8 cooperate with each other (FIG. 2), the elastic element 15 is compressed and the active tip 6*b* of the pencil 6 is applied with a certain pressure on the paper 7.

According to the example of FIG. 2, the stop means of the guide 5 are constituted by an inner annular shoulder 12 on which abuts an annular shoulder 13 of the pencil 6; this shoulder 13 is for example the shoulder allowing a cap (not shown) to be fitted on the pencil 6.

Figure 3:
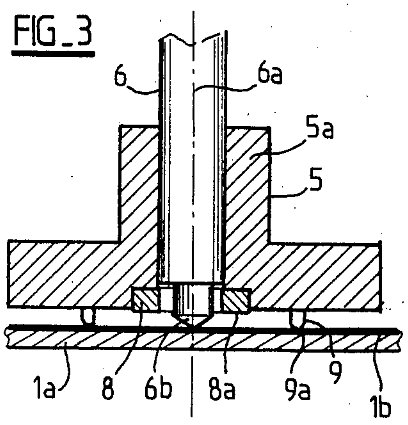
FIG. 3 is a view in elevation and in vertical section showing a second embodiment of the pencil-holder of the invention.

According to the embodiment of FIG. 3, on the contrary, the guide 5 is designed to allow the pencil 6 to slide freely in the direction of its axis 6*a* when this pencil is received in said guide 5. Thus, according to this embodiment, the active tip 6*b* of the pencil 6 is applied on the paper 7 simply due to the weight of the pencil 6.

The first magnet 3 is ring-shaped and the source of light 10 is placed opposite the opening of this magnet 3 (FIG. 2). Thus, the magnet 3 also serves as diaphragm defining the cross section of the light beam emitted by the source 10.

The second magnet 8 is also ring-shaped and its opening is placed opposite the guide 5 so as to surround the lower end of the pencil 6; this end of the pencil 6 thus passes through the magnet 8 and its tip 6*b* projects beyond the pole face 8*a* of the magnet 8 facing the paper 7.

According to the example shown in FIG. 1, the control means for displacing the carriage 2 along the X- and Y-axes comprise: (a) a first endless screw 16 pivoting in bearings 16*a* in the box 1, this endless screw 16 being oriented along one of the directions (X and Y) are cooperating with a nut 17 fast with an intermediate carriage 18 which is mounted in the box 1 to move in this latter direction, (b) a first motor 19 for driving this first endless screw 16; (c) a second endless screw 20 oriented in the other direction and pivoting in bearings 20*a* in the intermediate carriage 18, and (d) a second motor 21 for driving this second endless screw 20, said latter screw cooperating with a nut 22 fast with the carriage 2 bearing the first magnet 3.

Figure 4:
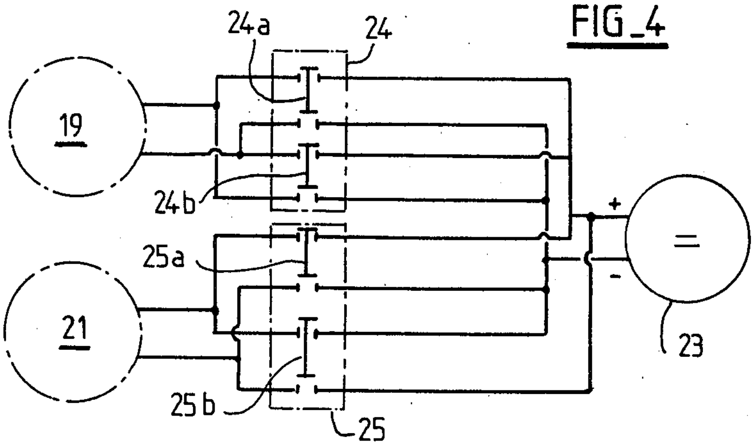
FIG. 4 is an electrical diagram of the connection of the motors of the device of FIG. 1.

Each of the motors 19 and 21 is of the D.C. type with two directions of motion and it is connected to a source of electric current 23 via an electrical connection on which is interposed a reversing switch 24 and 25, respectively, particular to said motor 19 and 21 respectively (FIG. 4). Each reversing switch 24,25 comprises two contactors 24*a*, 24*b* and 25*a*, 25*b*, respectively. The closed position of each of these contactors corresponds to the supply of the motor in question with a current circulating in a corresponding direction.

Figure 5:
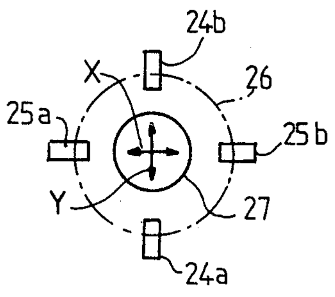
FIG. 5 is a diagram showing in plan view the arrangement of the contactors of the control circuit of the device of FIG. 1.

The contactors 24*a*,24*b*,25*a*,25*b* are of the open type at rest and they are distributed along a closed curve such as the circle 26 of FIG. 5, so that the two contactors associated with the same motor are placed on this curve 26 opposite each other.

A manoeuvring member 27 placed inside this closed curve 26 may move in the direction of each of said contactors, to act on an element for controlling this contactor with a view to placing this latter in closed position.

Figure 6:
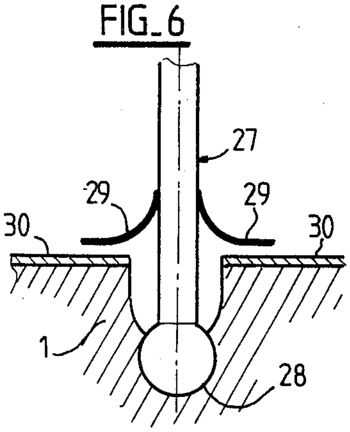
FIG. 6 is a schematic view in section and in elevation of the manoeuvring member of the device of FIG. 1.

As may be seen in FIG. 6, the manoeuvring member 27 is a rod articulated at its lower end on the box 1 by means of a ball and socket joint 28; the rod 27 laterally bears four contact blades 29 each adapted to cooperate with a contact plate 30 fixed on the box 1. Each blade 29 forms with the corresponding plate 30 a contactor 24*a*, 24*b*, 25*a* or 25*b*. The blades 29 and the plates 30 associated therewith are advantageously arranged to allow simultaneous closure of two adjacent contactors by suitably positioning the rod 27.

Figure 7:
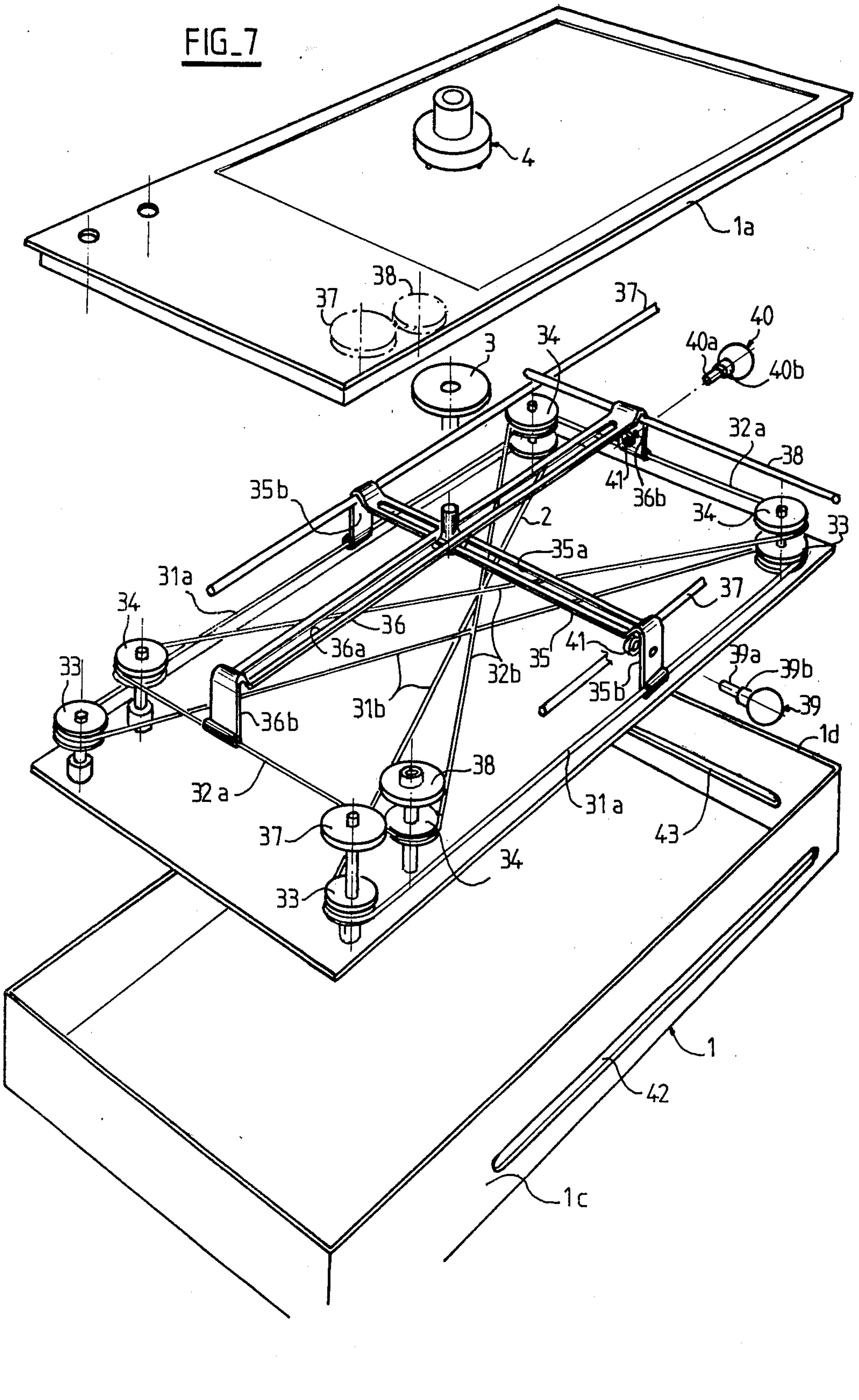
FIG. 7 is an exploded view in perspective of a device according to a second embodiment of the invention.

According to the embodiment shown in FIG. 7, the means for controlling the displacement of the carriage 2 along the X- and Y-axes comprise two endless belts 31 and 32 each mounted on four pulleys 33,34; each endless belt comprises two parallel sides 31*a*, 32*a* and two sides 31*b*, 32*b* intersecting in an X. The parallel sides 31*a* of one belt are oriented in one of the directions (X and Y) whilst those (32*a*) of the other belt are oriented in the other direction.

The carriage 2 is arranged so as to be at the intersection of longitudinal grooves 35*a* and 36*a* in two strip elements 35 and 36 at right angles to each other, these strip elements being guided, by means of bars 37 and 38 respectively, fixed to the box and disposed therein, in order to be able to move transversely to their longitudinal axis.

Each strip element 35, 36 is fixed, by lateral flanges 35*b*, 36*b*, to the parallel sides 31*a* and 32*a* respectively of the belts 31 and 32.

For the displacement of the carriage 2 along the X- and Y-axes, two peripherically grooved knobs 37 and 38 disposed outside the box 1 are manoeuvred. Each manoeuvring knob 37,38 rotates with a pulley 33,34, respectively.

For blocking the carriage 2 and the mobile elements 31 to 36 located in the box 1 in position, two screws 39,40 are provided, which may each be screwed in a tapping 41 in a lateral flange 35*b* and 36*b* respectively. A rectilinear slot 42, 43 is made on the side 1*c* and 1*d*, respectively, of the box 1, said side being adjacent said lateral flange 35*b*, 36*b*, respectively, comprising the tapping 41. These slots 42, 43 allow the passage of the stem 39*a*,40*a* of the corresponding locking screw 39,40, of which the head 39*b*, 40*b*, projecting outwardly, has a cross-section of diameter larger than the width of the slots 42,43; the screw heads 39*b*, 40*b*are intended to abut against the edges of the slots 42, 43 when the screws 39,40 are locked.

What I claim is:

1. Device for drawing a pattern or design on a support, comprising a pencil holder fast with a magnetic piece sliding on a plate and moved, through said plate, by a first magnet, characterized in that said device comprises:
   - a box, generally parallelepipedic in form, with an upper wall composed of non-magnetic material,
   - in this box: a carriage movable along the X- and Y-axes relatively to the plane of the upper wall of the box,
   - control means for displacing the carriage along the X- and Y-axes,
   - a first magnet mounted on the carriage, one of its magnetic poles, called first pole, facing the upper wall of the box,
   - a pencil-holder adapted to rest on the outer face of said upper wall of the box, this pencil-holder comprising:
     - (a) a guide for receiving and holding at least laterally a pencil with the axis thereof not parallel to the plane of said upper wall and with the active tip of the pencil in contact with a drawing support resting on the upper wall of the box, (b) a second ring magnet adapted to cooperate with the first magnet, its pole opposite that of said first pole facing downwards, the opening of the second magnet being placed opposite the guide so as to surround the end of the pencil, and (c) at least one sliding member by which the pencil holder is adapted to slide on said drawing support.

2. The device of claim 1, wherein the upper wall of the box is translucent and a source of light of reduced dimensions is placed on the carriage opposite this upper wall.

3. The device of claim 2, wherein said source of light is an electric lamp whose electric current supply is controlled by a manoeuvring member placed on the outside of the box.

4. The device of claim 1, wherein the guide further comprises stop means on which the pencil may rest by counter-stop means, said guide being mounted on a body of the pencil-holder, via an elastic member allowing a downward movement of said guide with respect to said body, by application of a force, the latter resting on the upper wall of the box via the sliding member and the second magnet is mounted on said guide.

5. The device of claim 1, wherein the guide is designed to allow the pencil to slide in the direction of its axis when this pencil is received in said guide.

6. The device of claim 1, wherein the first magnet is ring-shaped and the source of light is placed opposite the opening of this magnet.

7. The device of claim 1, wherein the opening of the second ring magnet is placed opposite the guide so as to surround the axis thereof.

8. The device of claim 1, wherein at least the upper wall of the box is made of plastics material.

9. The device of claim 1, wherein the means for controlling the displacement of the carriage along the X- and Y-axes comprise: a first endless screw pivoting in bearings in the box, this screw being oriented along one of the directions (X and Y) and cooperating with a nut fast with an intermediate carriage mounted to move in the box in this latter direction, a first motor for driving this first endless screw, a second endless screw oriented in the other direction and pivoting in bearings in the intermediate carriage, a second motor for driving this second endless screw, the latter cooperating with a nut fast with the carriage bearing the first magnet, each of said motors being of the D.C. type with two directions of motion and being connected to a source of electric current via an electrical connection on which is interposed a reversing switch particular to said motor, each reversing switch comprising two contactors, the closed position of each of these contactors corresponding to the supply of the motor in question with a current in a corresponding direction.

10. The device of claim 9, wherein the contactors are of the open type at rest and they are distributed spatially along a closed curve so that the two contactors associated with the same motor are placed opposite each other, and a manoeuvring member placed inside this closed curve may move in the direction of each of said contactors to act on an element for controlling this contactor with a view to placing the latter in closed position.

* * * * *